Figure 1:
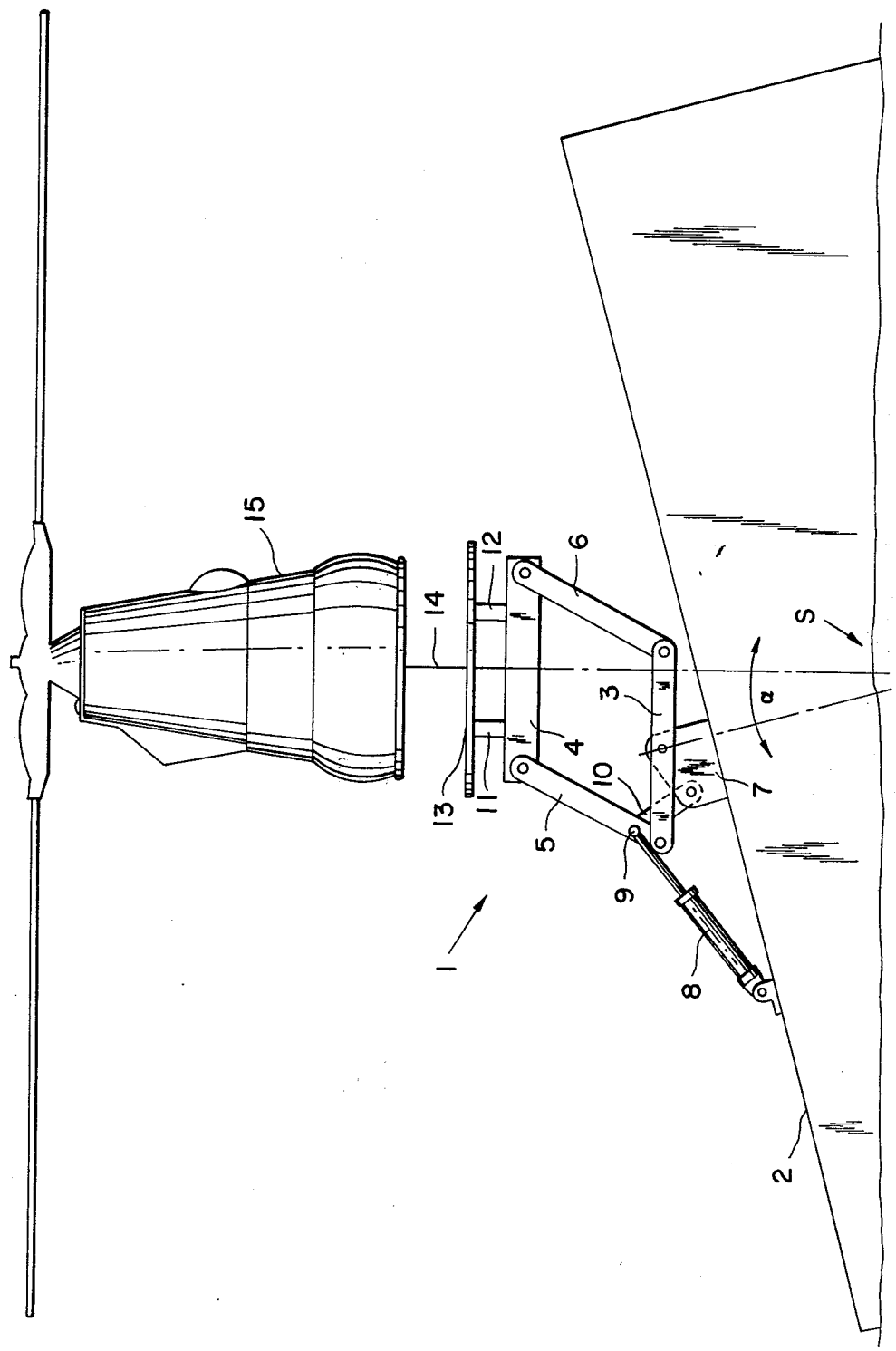

United States Patent [19]

Krusius

[11] 3,948,467

[45] Apr. 6, 1976

[54] DEVICE FOR POSITION STABILIZATION

[75] Inventor: Jochen Krusius, Markdorf, Germany

[73] Assignee: Dornier GmbH, Friedrichshafen, Germany

[22] Filed: Nov. 18, 1974

[21] Appl. No.: 525,026

[30] Foreign Application Priority Data

Jan. 19, 1974  Germany............................ 2402529

[52] U.S. Cl............ 244/116; 74/110; 114/43.5 AC; 244/17.17
[51] Int. Cl.² .......................................... B64F 1/00
[58] Field of Search..... 244/116, 115, 114 R, 17.17; 114/43.5 AC; 74/469, 110; 248/284, 424, 180, 182–185

[56] References Cited

UNITED STATES PATENTS 1,558,567  10/1925  Schein........................ 114/43.5 AC Primary Examiner—Trygve M. Blix
Assistant Examiner—Barry L. Kelmachter
Attorney, Agent, or Firm—James E. Bryan

[57] ABSTRACT

A device for position stabilization of a take-off and landing platform for aircraft, which comprises a forcibly-guided parallelogram linkage adapted to be rotatably mounted on a mobile carrier, a take-off and landing platform rigidly connected with and parallel to the upper parallelogram part, and an operating device rotatably connected at each end between the carrier and one of the side parts of the parallelogram linkage.

5 Claims, 3 Drawing Figures

DEVICE FOR POSITION STABILIZATION

The present invention relates to a device for position stabilization of a take-off and landing platform for captive or non-captive aircraft or flying instruments.

Landing devices or docking trolleys in airplanes and aircraft are known per se. They serve for the take-off and landing of the airplane or aircraft and have their own spring mechanism for avoiding landing shocks or impacts. These docking trolleys or landing gears are carried along with the airplane and constitute an additional load during the flight. An exception are airplanes which, during take-off, are mounted upon a specific transportable frame and which, for example in the case of sail planes or gliders, undergo an acceleration by means of a towing winch in order to be able to take-off. After lift-off, the landing gear remains on the ground. Such a gear or frame is no longer needed for landing. For the purpose of avoiding landing shocks, resilient skids or runners are mounted at the underside of the fuselage.

Also known are devices in which, for example, a small foldable helicopter starts from a transportable starting platform and is adapted to also land thereon. For landing, the helicopter is equipped with a tripod docking trolley carried during flight.

Lastly, known from German Auslegeschrift DAS No. 1,506,006, is a starting and landing device for vertical take-off and landing (VTOL) aircraft or flying instruments wherein the device described comprises a receiving bed positioned within a frame and coordinated or adapted in the form thereof to the aircraft base, and wherein the frame is resiliently cushioned against the ground by means of spring elements or shock absorber legs or struts. The aircraft is centered in this manner and guided to the predetermined spot, whereby the generated landing shock is damped. In order to make it possible to also use such aircraft on mobile carriers, such as land or water vehicles, the receiving bed together with the aircraft anchored therein with the frame is tiltably positioned, whereby the frame is open toward one side. Both the frame and the receiving bed are tiltable by means of spring elements. As a result, the rotor blades, in aircraft similar to helicopters, can be folded and positioned in a horizontal plane after tilting of the aircraft.

All of these starting and landing platforms have the common disadvantage that, when they are used on mobile vehicles or carriers, they have only a small stabilizing device or mechanism, or none at all, and so that accordingly a correct take-off of an aircraft, particularly a captive aircraft, is rendered impossible.

Starting out from these facts, the present invention provides a device with which the starting or landing platform proper of the aircraft is defined and stabilized in its position even where the carrier or the platform thereof assumes undefined positions. In this connection it was intended that the level and rolling compensations, for example in water vehicles, be particularly taken into account.

This object is obtained, in accordance with the present invention, by virtue of the fact that a forcibly-guided parallelogram linkage or rod system is rotatably positioned on a mobile carrier, for example a land and water vehicle, wherein the upper parallelogram guide part or element is rigidly connected with the starting and landing platform arranged parallel thereto, or connected by way of shearing hinges or joints with a second guide part or element mounted thereabove. The linkage comprises at the underside thereof a bent or curved guide rail or guide bar which is positioned between the parallelogram guide part and the second guide part or element, which guide rail or guide bar is movable between a pair of rollers mounted on a guide arm that is connected with the lower parallelogram guide part. At one of the lateral guide parts or elements of the parallelogram linkage or rod system, an operating cylinder is rotatably positioned with one end thereof at the guide part, and with the other end thereof on the carrier.

Further characteristics of the present invention are that mounted above the first parallelogram linkage or rod system is a second parallelogram linkage or rod system which is composed of a pair of shearing joints or hinges, rotatably connected with the upper parallelogram guide part or element, and movable with each other by way of pairs of toothed segments. The second guide part or element carrying the take-off and landing platform is rotatably connected with the upper pair of toothed segments, and a second operating cylinder is mounted opposite the first operating cylinder and rotatably positioned thereon. The second cylinder, with one end thereof, engages at one of the lower shearing joint or hinge arms, and at the other end is movably connected with an elongated arm of the upper parallelogram guide part or element.

The advantages obtained with the present invention are particularly that the take-off and landing platform carried by a mobile carrier, for example a water vehicle, is defined with respect to its leveling (position and stabilization) prior to the take-off of an aircraft of flying instrument, and during the subsequent landing thereof. By virtue of the fact that a forcibly-guided parallelogram linkage or rod system is used which is controlled by an operating cylinder, it is possible that the horizontal position of the take-off and landing platform is maintained during undefined movements of the carrier, for example rolling movements of a ship. The forcible guide attained by means of the parallelogram linkage or rod system acting as an additional member renders possible a compensation in two axes, i.e., the rolling angle on the one hand, and of the translating movement of the platform on the other hand. In this connection, it is necessary to accept the vertical error caused by the tilting position of the parallelogram linkage or rod system, or to compensate therefor with a second device. This vertical error is the negligibly varying distance between the platform or the table and the rolling axis, for example a ship. Such an additional device is connected above a guide arm connected to the lower parallelogram guide part or element, the basic linkage, with a pair of rollers positioned thereon and between which a radially curved guide rail or guide bar is guided corresponding to the generated rolling angle. As a result thereof, the distance between the base of the parallelogram linkage and the platform is maintained constant. Moreover, by reason of the curvature of the guide rail or guide bar, the slight altitude error caused by the inclined position of the carrier, for example a ship, is compensated for. The parallel guide of the lower box frame connected to the upper parallelogram guide part or element to the platform is assured by shearing hinges or joints provided on both sides.

In order to attain an additional compensation for the vertical carrier movements occasioned, for example, during ship movements by pitching and dipping, and during which the platform is moved up and down by the amount of the vertical ship movement, the first level regulating device is combined with a second one that is mounted thereabove. At that time, an additional operating cylinder controls the linkage or rod system for the purpose of level compensation, whereby one toothed segment guide maintains the parallelism of the two planes of the platform and the lower box frame. Due to the combination of these two leveling and compensating devices, and with the aid of two operating cylinders, it is possible to stabilize the position of the take-off and landing platform, and to compensate for the rolling and vertical movements of the carrier, such as a ship.

In the case of the use of a captive flying aircraft instrument, there result still further possibilities, during the retracting and extending of the mooring or anchoring cable, for a compensation of the vertical movements, particularly ship movements, such as rolling, pitching, and the like.

Figure 2:
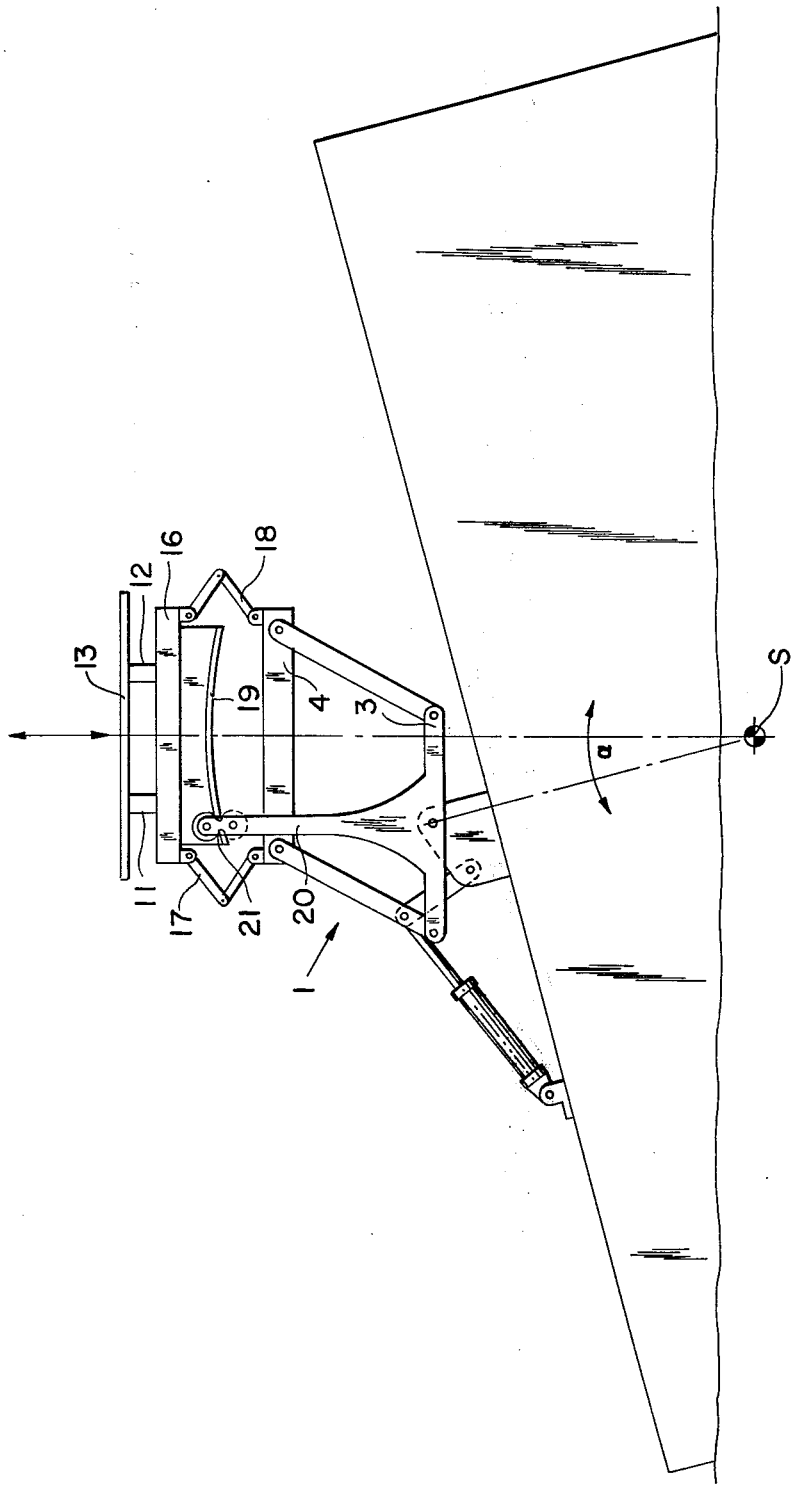
Figure 3:
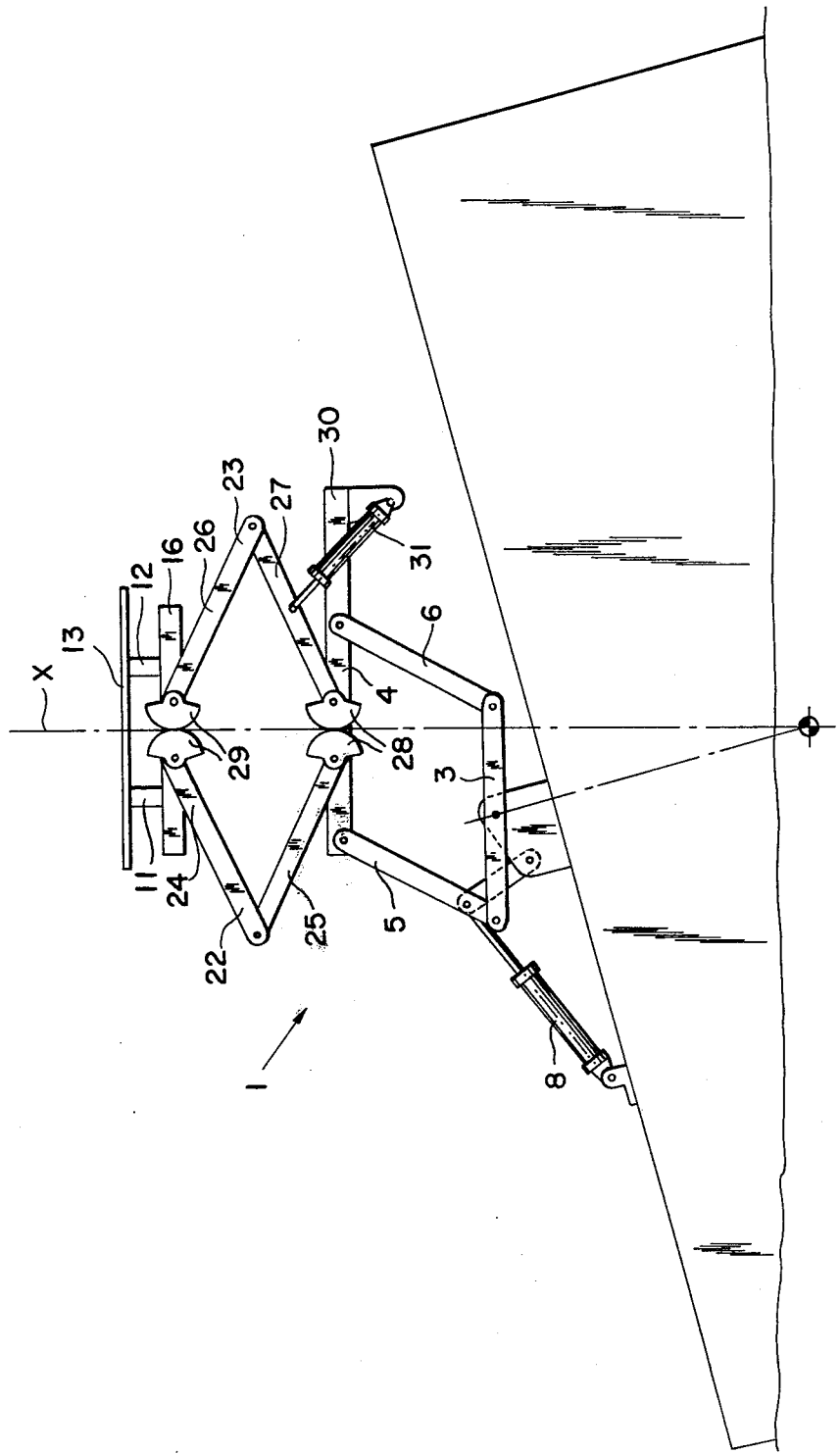

Embodiments of the present invention will now be further described hereinbelow with reference to the accompanying drawings, wherein FIG. 1 illustrates the arrangement, in principle, of a device designed for the position stabilization of an aircraft instrument on a watercraft, FIG. 2 illustrates the device according to FIG. 1 with a guide part or element mounted thereabove, and FIG. 3 illustrates the device according to FIG. 1 with a second parallelogram linkage or rod system mounted thereabove.

Shown in FIG. 1 is the basic construction of a device 1 for position stabilization above the metacenter S on a ship's deck 2. The device 1 itself is composed of lower and upper parallelogram guide parts or elements 3 and 4 and lateral guide parts or parallelogram linkages or rod systems 5 and 6. The lower guide part 3 is rotatably mounted on a carrier 7 which is rigidly mounted on the ship's deck 2. At the lateral guide part 5 there engages, rotatably mounted, an operating cylinder 8 which, laterally of the carrier 7, is rotatably supported at the other end thereof on the ship's deck 2. The guide part 5 is connected, at the pivot point 9 of the operating cylinder 8, with a connecting member 10 which serves for supporting the forcibly-guided parallelogram linkage or rod system 3 and 4 during the compensating movement of the device 1 in the case of rolling movements about the rolling angle $\alpha$ of the ship's deck 2. Mounted at the upper parallelogram guide part 4 being constructed as a box frame, and over shock dampers 11 and 12, is a take-off and landing platform 13 over which hovers a flying instrument 15 held in position by means of a mooring cable 14.

In FIG. 2, the construction of the device 1 for position stabilization corresponds to that shown in FIG. 1. While the construction there serves as a sea motion-following device for rolling compensation, and while with the aid thereof mainly the rolling angle $\alpha$ about the metacenter S is compensated for, there is here provided, over the upper parallelogram guide part 4 of the device 1 constructed as a box frame, a second guide part 16 also constructed as a box frame, wherein the latter is connected by way of the shearing links or joints 17 and 18 with the lower guide part 4 for the vertical direction of movement. Positioned over the guide part 16, analogously to FIG. 1, is the take-off and landing platform 13 being connected by means of the shock or impact dampers 11 and 12. Mounted at the underside of the guide part 16 between the upper parallelogram guide part 4 and the second guide part 16 is a guide rail or guide bar 19 which is radially curved with respect to the metacenter S, and which glides back and forth and adjusts itself (see the direction of the arrow) between a pair of rollers 21 mounted at a guide arm 20 which is rigidly connected with the lower parallelogram guide part 3, according to the rolling angle $\alpha$ and the vertical movement.

Finally, shown in FIG. 3 is a variation of the device 1 in which there is mounted above the first parallelogram linkage or rod system 3, 4, 5 and 6, a second parallelogram linkage or rod system 24, 25, 26 and 27, composed of a pair of shearing links 22 and 23, and which are connected with each other and movable by way of pairs of toothed segments 28 and 29 mounted one above the other in the axis x. The upper pair of toothed segments 29 is rotatably connected with the guide part 16, upon which — supported by the shock or impact dampers 11 and 12 — the take-off and landing platform or table 13 is mounted. The vertical movement and the level compensation of the shearing hinges or joints 22 and 23 and of the take-off and landing platform 13 is controlled by a second operating cylinder 31 mounted opposite the first operating cylinder 8 and at an arm 30 positioned after the upper parallelogram guide part 4.

This additional provision assures that in addition to the rolling and vertical error compensation (according to FIGS. 1 and 2) the level compensation of the table 13 is safeguarded on a larger vertical path.

It will be obvious to those skilled in the art that many modifications may be made within the scope of the present invention without departing from the spirit thereof, and the invention includes all such modifications.

What is claimed is:

1. A device for position stabilization of a take-off and landing platform for aircraft, which comprises a forcibly-guided parallelogram linkage means having upper, lower, and side parts and adapted to be rotatably mounted on a mobile carrier,
    a take-off and landing platform connected with and parallel to the upper parallelogram part,
    and operating means rotatably connected at its ends to said carrier and to one of the side parts of the parallelogram linkage.

2. A device according to claim 1 in which said operating means is an operating cylinder.

3. A device according to claim 1 including, between said platform and said upper parallelogram part, a second part having a curved guide rail means at the underside thereof,
    said guide rail means being movable between a pair of roller means mounted on a guide arm connected with the lower parallelogram part,
    shearing hinge means connecting said second part with said upper parallelogram part,
    and said platform being connected to said second part.

4. A device according to claim 1 including, between said platform and said upper parallelogram part, a second parallelogram linkage composed of a pair of shearing hinges having upper and lower shearing hinge arms rotatably connected with said upper parallelogram part and movable with each other by way of pairs of toothed segments,
    platform-supporting means rotatably connected with the upper toothed segment pair, and second operating means rotatably connected at its ends to one of the lower shearing hinge arms and to an extended arm of said upper parallelogram part, said second operating means being positioned opposite said other operating means.

5. A device according to claim 4 in which said second operating means is an operating cylinder.

* * * * *